US007020545B2

(12) United States Patent
Kamdar et al.

(10) Patent No.: US 7,020,545 B2
(45) Date of Patent: Mar. 28, 2006

(54) METHOD AND SYSTEM FOR MANAGING REGISTRATION REQUESTS OF TELEMATICS UNITS

(75) Inventors: Hitan S. Kamdar, Utica, MI (US); Kenneth Enborg, Bloomfield Hills, MI (US); Russell A. Patenaude, Macomb Township, MI (US); Brad T. Reeser, Lake Orion, MI (US)

(73) Assignee: General Motors Corporation, Detroit, MI (US)

( * ) Notice: Subject to any disclaimer, the term of this patent is extended or adjusted under 35 U.S.C. 154(b) by 59 days.

(21) Appl. No.: 10/767,238

(22) Filed: Jan. 28, 2004

(65) Prior Publication Data

US 2005/0165514 A1 Jul. 28, 2005

(51) Int. Cl.
*G06F 7/00* (2006.01)
*H04B 1/38* (2006.01)

(52) U.S. Cl. .......................................... 701/2; 455/574

(58) Field of Classification Search .................... 701/2, 701/33, 45; 340/426.13, 426.15, 426.16, 340/426.19, 426.2, 989; 367/9.1, 10.1, 10.2; 342/357.09, 357.1; 455/574
See application file for complete search history.

(56) References Cited

U.S. PATENT DOCUMENTS 5,442,553 A * 8/1995 Parrillo ....................... 455/420
5,799,256 A * 8/1998 Pombo et al. .............. 455/574
6,615,186 B1 * 9/2003 Kolls .......................... 705/26
6,738,914 B1 * 5/2004 Christopher ................ 713/323
6,785,595 B1 * 8/2004 Kominami et al. ........... 701/36
6,879,894 B1 * 4/2005 Lightner et al. .............. 701/33
2002/0150050 A1 * 10/2002 Nathanson .................. 370/241
2002/0197988 A1 * 12/2002 Hellaker ...................... 455/423
2003/0185162 A1 * 10/2003 Fraser et al. ................ 370/311
2004/0138790 A1 * 7/2004 Kapolka et al. .............. 701/29
2004/0198466 A1 * 10/2004 Walby et al. ............... 455/574

* cited by examiner

*Primary Examiner*—Michael J. Zanelli
(74) *Attorney, Agent, or Firm*—Cardinal Law Group

(57) ABSTRACT

The present invention provides a method for managing registration requests of a telematics unit within a telematics equipped mobile vehicle. The method includes receiving a restricted use command from a service provider, initiating a restricted use mode based on the received restricted use command, and modulating a transmission rate of at least one registration request based on the restricted use mode. The restricted use command may include a contact increment. The contact increment may include contact rate information. The contact increment may include contact initiation information. The restricted use mode may operate the telematics unit in a low-power configuration. The step of modulating the transmission rate of the registration request may include identifying a contact increment within the received restricted use command, determining contact information within the contact increment, and implementing the modulated transmission rate based on the determined contact information.

27 Claims, 3 Drawing Sheets

METHOD AND SYSTEM FOR MANAGING REGISTRATION REQUESTS OF TELEMATICS UNITS

FIELD OF THE INVENTION

This invention relates generally to wireless communications with a mobile vehicle. More specifically, the invention relates to a method and system for managing registration requests of a telematics unit within a telematics equipped mobile vehicle.

BACKGROUND OF THE INVENTION

The opportunity to utilize wireless features in a mobile vehicle is ever increasing as the automobile is being transformed into a communications and entertainment platform as well as a transportation platform. Wireless features include wireless vehicle communication, networking, maintenance and diagnostic services for a mobile vehicle.

Typically, conventional wireless systems within mobile vehicles (e.g. telematics units) provide voice communication. Recently, these wireless systems have been utilized to update systems within telematics units, such as, for example radio station presets. Similar to other conventional wireless systems, telematics units within mobile vehicles are required to regularly register with the mobile vehicle communication system (MVCS). This registration is called a registration request. The registration request notifies the MVCS that the telematics unit is operational and is operating within a specified portion of the MVCS.

While the process of performing an individual registration request does not consume a great deal of system power, prolonged operation of registration requests, such as, for example every ten minutes will result in a system energy level reduction below an acceptable threshold. Typically, mobile vehicles are operated frequently enough that the system energy level does not drop below the acceptable threshold. Unfortunately, a prolonged period of mobile vehicle inactivity may result in a system energy level reduction below an acceptable threshold. This outcome is not desirable.

The present invention addresses these and other issues and advances the state of the art.

SUMMARY OF THE INVENTION

One aspect of the invention includes a method for operating a telematics unit within a mobile vehicle communication system including receiving a restricted use command from a service provider, initiating a restricted use mode based on the received restricted use command, and modulating a transmission rate of at least one registration request based on the restricted use mode.

In accordance with another aspect of the invention, a computer readable medium storing a computer program includes: computer readable code for processing a received restricted use command from a service provider; computer readable code for initiating a restricted use mode based on the received restricted use command; and computer readable code for modulating a transmission rate of at least one registration request based on the restricted use mode.

In accordance with yet another aspect of the invention, a system for operating a telematics unit within a mobile vehicle is provided. The system includes means for receiving a restricted use command from a service provider. Means for initiating a restricted use mode based on the received restricted use command is provided. Means for modulating a transmission rate of at least one registration request based on the restricted use mode is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
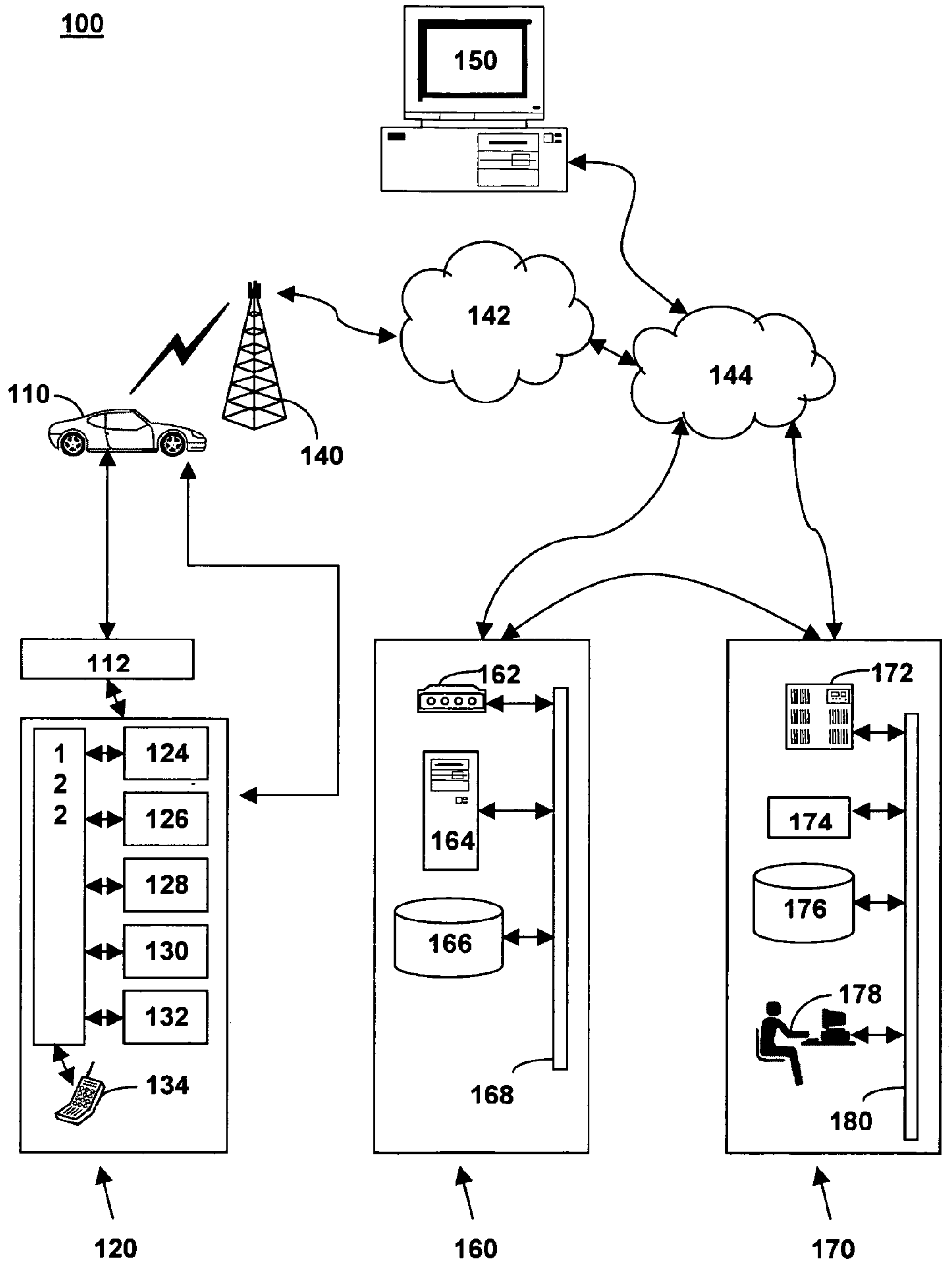
FIG. 1 illustrates an operating environment for implementing wireless communication within a mobile vehicle communication system.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications. Vehicle network 112 may also be referred to as a vehicle bus.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example speakers 132. Telematics unit 120 may include additional components not relevant to the present discussion.

In one embodiment, DSP 122 is implemented as a microcontroller, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone.

DSP 122 executes various computer programs that control programming and operational modes of electronic and mechanical systems within MVCU 110. DSP 122 controls communications (e.g. call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user-preferences for MVCU 110. In an example, a client utilizes computer 150 to initiate a restricted use mode (e.g. a low-power mode) that telematics unit 120 in MVCU 110 operates within for a user specified period of time. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

In an example, a client utilizes telematics unit 120 in MVCU 110 to communicate with an advisor in call center 170 to initiate a restricted use mode (e.g. a low-power mode) that telematics unit 120 in MVCU 110 operates within for a user specified period of time. In another example, a client utilizes land network 144 (e.g. a land line) to communicate with an advisor in call center 170 to initiate a restricted use mode (e.g. a low-power mode) that telematics unit 120 in MVCU 110 operates within for a user specified period of time.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, communications assistance, and managing registration requests. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, communications assistance, and registration request management. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140.

Figure 2:
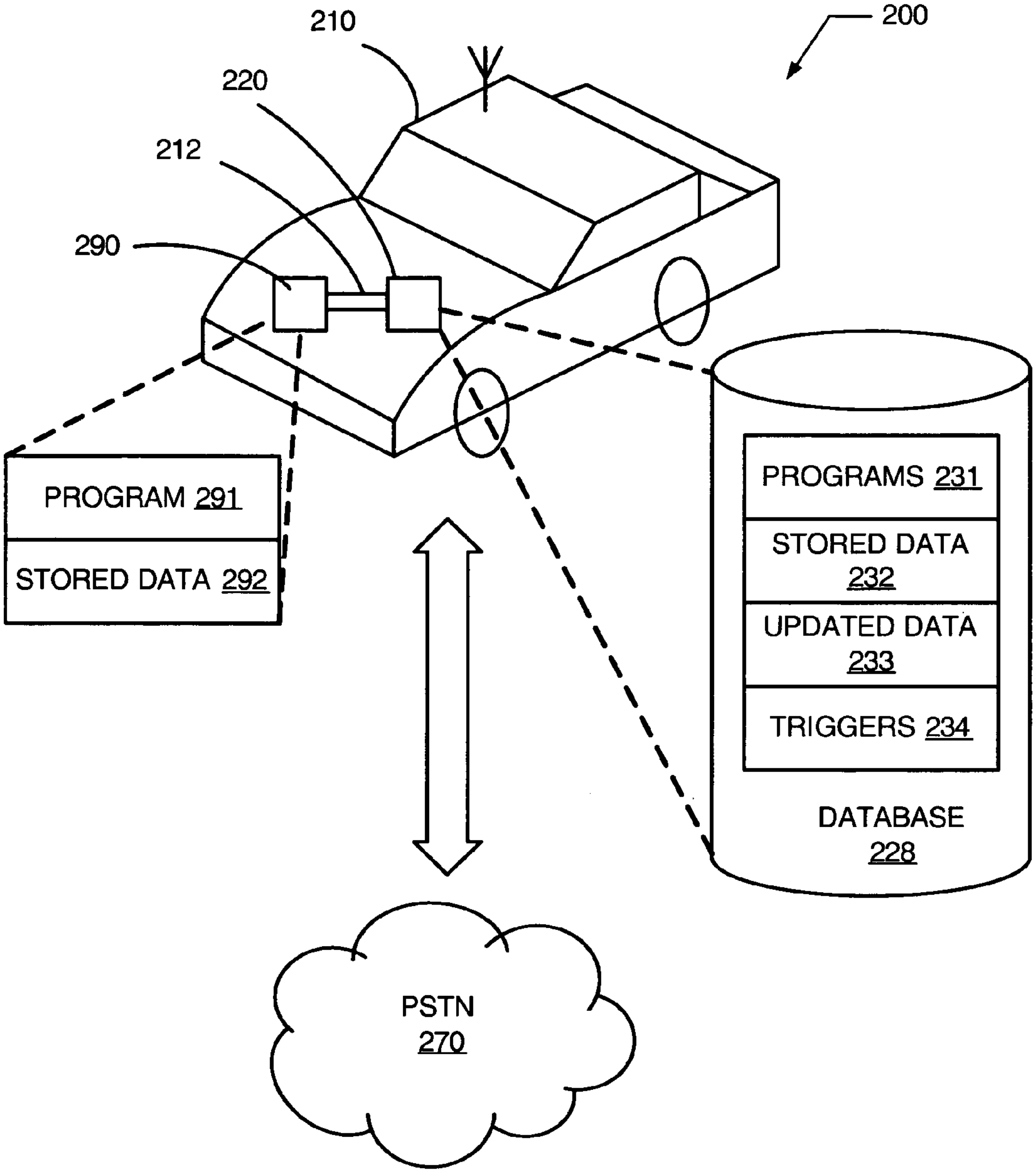
FIG. 2 is a block diagram of telematics based system in accordance with an embodiment of the present invention.

FIG. 2 is a block diagram of a telematics based system in accordance with an embodiment of the present invention. FIG. 2 shows a telematics based system 200 for managing registration requests of a telematics unit within a telematics equipped mobile vehicle. In FIG. 2, the system includes a mobile vehicle 210 having a telematics unit 220 coupled to one or more vehicle system modules 290 via a vehicle communication bus 212, and a communication network 270, such as, for example a public switched telephone network (PSTN). Telematics unit 220 further includes a database 228 that contains programs 231, stored data 232, updated data 233 and triggers 234. Vehicle system module (VSM) 290 further includes a program 291 and stored data 292. In one embodiment, VSM 290 is located within telematics unit 220. In FIG. 2, the elements are presented for illustrative purposes and are not intended to be limiting. System 200 may include additional components not relevant to the present discussion.

Telematics unit 220 is any telematics device enabled for operation with a telematics service provider, such as, for example telematics unit 120 as described with reference to FIG. 1. Telematics unit 220 in vehicle 210 is in communication with communication network 270 (e.g. a "PSTN"). Telematics unit 220 includes volatile and non-volatile memory components for storing data and programs. In one embodiment, memory components in telematics unit 220 contain database 228.

Database 228 includes one or more programs 231 for operating telematics unit 220, such as, for example, for managing registration requests of a telematics equipped mobile vehicle. In operation, a program module receives a restricted use command from a service provider at updated data 233. In one embodiment, the restricted use command includes a contact increment including contact information, such as, for example contact initiation information and contact rate information.

In an example, contact initiation information instructs the telematics unit to initiate a registration request modulation at a specific time, for example, within a low transmission activity period (e.g. "off peak"). In another example, contact rate information instructs the telematics unit to modulate the registration request at a specified transmission rate, such as, once per day or once per hour. In one embodiment, the contact increment is implemented as predetermined values as provided by the manufacturer. In another embodiment, the contact increment is implemented as one or more values provided by the communication network, such as, for example a service provider.

In an example, the restricted use command is cached within updated data 233. The restricted use command is stored at stored data 232. In one embodiment, telematics unit 220 acts as a data cache for restricted use commands. In another embodiment, program 231 includes software for receiving a restricted use command, initiating a restricted use mode based on the received restricted use command, and modulating a transmission rate of at least one registration request based on the restricted use mode.

In one embodiment, the restricted use mode operates the telematics unit in a low-power configuration, such as, for example operating the telematics unit in a "sleep" mode until the contact rate information instructs the telematics unit to modulate the registration request. In this embodiment, when the telematics unit transmits the registration request, the telematics unit is configured to receive an updated contact increment from the communication network, if provided. If an updated contact increment is not provided, the telematics unit registers with the communication network and resumes "sleep" mode until the next registration request as determined by the contact rate information.

The telematics unit is configured to provide updated telematics information, such as, for example vehicle location and system energy level to the communication network, if the communication network communicates with the telematics unit and the information is requested. In another embodiment, the updated telematics information is automatically provided. The communication between the telematics unit and the communication network is synchronized with a registration request.

Vehicle system module (VSM) 290 is any vehicle system control module having software and hardware components for operating, controlling or monitoring one or more vehicle systems. In one embodiment, VSM 290 is a global positioning system (GPS) module, such as, for example GPS unit 126 of FIG. 1. In this embodiment, the global positioning system (GPS) module provides positioning information to the telematics unit. In another embodiment, VSM 290 is a dash integration module, as is known in the art, that provides power management information, such as, system voltage information to the telematics unit. In another embodiment, VSM 290 is a controller for controlling a vehicle system such as, for example, a powertrain control module that provides engine and transmission system information.

Vehicle system module 290 contains one or more processors, one or more memory devices and one or more connection ports. In one embodiment, VSM 290 includes a software switch for scanning received information, such as, for example sensor information to identify that data has been received. VSM 290 is coupled to a vehicle communication bus 212, and therefore to any other device that is also coupled to vehicle communication bus 212. The vehicle communication bus is also referred to as a vehicle communication network. In one embodiment, VSM 290 is directly coupled to telematics unit 220, such as, for example vehicle communication bus 212 coupling telematics unit 220 to vehicle system modules 290. In an example, vehicle communication bus 212 is a vehicle communication network 112 as described in FIG. 1, above. In another embodiment, VSM 290 is indirectly coupled to telematics unit 220.

VSM 290 includes one or more programs 291 and stored data 292 stored in memory. In one embodiment, program 291 includes software for receiving sensor information and storing the received sensor information at stored data 292. In this embodiment, the received sensor information is passed to telematics unit 220 for processing, such as, for example to be transmitted from telematics unit 220 to service provider 270.

Figure 3:
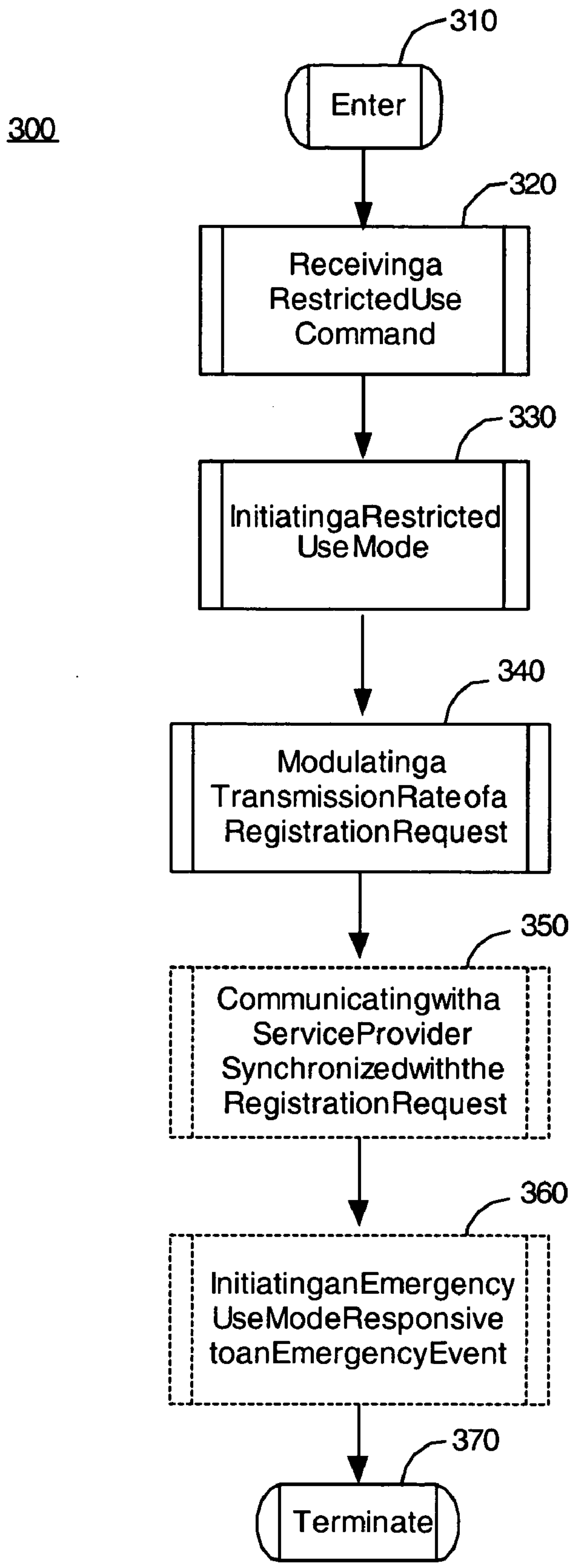
FIG. 3 is a flow diagram of one embodiment of a method of managing mobile handset portability within a telematics equipped mobile vehicle, in accordance with the present invention.

FIG. 3 is a flow diagram of an embodiment of a method of managing registration requests of a telematics unit within a telematics equipped mobile vehicle. In FIG. 3, method 300 may utilize one or more systems detailed in FIGS. 1 and 2, above. The present invention can also take the form of a computer usable medium including a program for configuring an electronic module within a vehicle. The program stored in the computer usable medium includes computer program code for executing the method steps described in FIG. 3. In FIG. 3, method 300 begins at step 310.

At step 320, a restricted use command is received from a service provider. In one embodiment, the restricted use command includes a contact increment, such as, for example contact rate information and contact initiation information. In another embodiment, the restricted use command includes one or more predetermined values.

At step 330, a restricted use mode is initiated based on the received restricted use command. In one embodiment, the restricted use mode operates the telematics unit in a low-power configuration, such as, for example operating the telematics unit in a "sleep" mode.

At step 340, a transmission rate of at least one registration request is modulated based on the restricted use mode. In one embodiment, modulating the transmission rate of the registration request includes identifying a contact increment within the received restricted use command, determining contact information within the contact increment, and implementing the modulated transmission rate based on the determined contact information.

At optional step 350, the telematics unit communicates with a communication network, such as, for example a service provider synchronized with the registration request. In one embodiment, the telematics unit receives an updated contact increment from the service provider. In another embodiment, the telematics unit provides updated telematics information to the service provider. In these embodiments, receiving the updated communication information and providing updated telematics information is synchronized with a registration request. In another embodiment, the updated telematics information includes vehicle location, system energy level, ignition cycles, ignition status and diagnostic trouble codes (DTCs).

In an example, the telematics unit provides updated telematics information, such as, for example GPS information to the service provider synchronized with the registration request. In this example, if the service provider determines that the vehicle has been relocated while in restricted use mode, the service provider can then take appropriate action.

At optional step 360, an emergency use mode is initiated responsive to an emergency event. In one embodiment, initiating the emergency use mode includes detecting an emergency event and initiating an emergency use mode responsive to the detected emergency event. Examples of an emergency event include vehicle theft, airbag deployment, a predetermined reading from collision sensors and an emergency button press.

In an example, the telematics unit communicates with a service provider when the telematics unit determines that the mobile vehicle has been accessed while the telematics unit is in restricted use mode. In this example, the service provider can then take appropriate action based on the emergency event.

At step 370, the method is terminated.

The above-described methods and implementation for managing registration requests of a telematics unit within a telematics equipped mobile vehicle are example methods and implementations. These methods and implementations illustrate one possible approach for managing registration requests usage of a telematics unit within a telematics equipped mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method for operating a telematics unit within a mobile vehicle communication system, the method comprising:

receiving a restricted use command from a service provider;

initiating a restricted use mode based on the received restricted use command; and modulating a transmission rate of at least one registration request based on the restricted use mode.

2. The method of claim 1, wherein the restricted use command comprises a contact increment.

3. The method of claim 2, wherein the contact increment comprises contact rate information.

4. The method of claim 2, wherein the contact increment comprises contact initiation information.

5. The method of claim 2, wherein the contact increment is one or more predetermined values.

6. The method of claim 1, wherein the restricted use mode operates the telematics unit in a low-power configuration.

7. The method of claim 1, wherein modulating the transmission rate of the registration request comprises:

identifying a contact increment within the received restricted use command;

determining contact information within the contact increment; and implementing the modulated transmission rate based on the determined contact information.

8. The method of claim 2, further comprising:

receiving an updated contact increment from the service provider; and providing updated telematics information to the service provider;

wherein receiving the updated contact increment is synchronized with a registration request.

9. The method of claim 8, wherein the updated telematics information is selected from the group consisting of: vehicle location, system energy level, ignition cycles, ignition status and diagnostic trouble codes.

10. The method of claim 1, further comprising:

detecting an emergency event; and initiating an emergency use mode responsive to the detected emergency event.

11. The method of claim 10 wherein the emergency event is selected from the group consisting of vehicle theft, airbag deployment, a predetermined reading from collision sensors and an emergency button press.

12. A computer readable medium for operating a telematics unit within a mobile vehicle, comprising:

computer readable code for processing a received restricted use command from a service provider;

computer readable code for initiating a restricted use mode based on the received restricted use command; and computer readable code for modulating a transmission rate of at least one registration request based on the restricted use mode.

13. The computer readable medium of claim 12, wherein the restricted use command comprises a contact increment.

14. The computer readable medium of claim 13, wherein the contact increment comprises contact rate information.

15. The computer readable medium of claim 13, wherein the contact increment comprises contact initiation information.

16. The computer readable medium of claim 13, wherein the contact increment is one or more predetermined values.

17. The computer readable medium of claim 12, wherein the restricted use mode operates the telematics unit in a low-power configuration.

18. The computer readable medium of claim 12, wherein the computer readable code for modulating the transmission rate of the registration request comprises:

computer readable code for identifying a contact increment within the received restricted use command;

computer readable code for determining contact information within the contact increment; and computer readable code for implementing the modulated transmission rate based on the determined contact information.

19. The computer readable medium of claim 13, further comprising:

computer readable code for processing a received updated contact increment from the service provider; and computer readable code for providing updated telematics information to the service provider;

wherein receiving the updated contact increment is synchronized with a registration request.

20. The computer readable medium of claim 19, wherein the updated telematics information is selected from the group consisting of: vehicle location, system energy level, ignition cycles, ignition status and diagnostic trouble codes.

21. The computer readable medium of claim 12, further comprising:

computer readable code for detecting an emergency event; and computer readable code for initiating an emergency use mode responsive to the detected emergency event.

22. A system for operating a telematics unit within a mobile vehicle, the system comprising:

means for receiving a restricted use command from a service provider;

means for initiating a restricted use mode based on the received restricted use command; and means for modulating a transmission rate of at least one registration request based on the restricted use mode.

23. A method for operating a telematics unit within a mobile vehicle communication system, the method comprising:

receiving a restricted use command from the call center, the restricted use command including a specified period of vehicle inactivity;

initiating a restricted use mode based on the received restricted use command;

programming the telematics unit to synchronize transmission timing to the call center of at least one registration request based on the restricted use mode;

repeating the synchronized transmission of at least one registration request at a specified rate until the specified period of vehicle inactivity terminates; and returning the telematics unit to normal operating mode after the specified period of vehicle inactivity terminates.

24. The method of claim 23, wherein the restricted use mode includes instructing the telematics unit to operate in a low-power configuration.

25. The method of claim 23, wherein the synchronized transmission of at least one registration request includes information selected from the group consisting of: vehicle location, system energy level, ignition cycles, ignition status and diagnostic trouble codes.

26. The method of claim 23, further comprising:

detecting the mobile vehicle has been accessed; and initiating a mobile vehicle accessed mode responsive to the detected access to the mobile vehicle.

27. The method of claim 23, wherein the origin of the specific period of vehicle inactivity is selected from the group consisting of: end user, factory programmed, and call center.

* * * * *